(12) United States Patent
Rehkemper et al.

(10) Patent No.: US 6,525,706 B1
(45) Date of Patent: Feb. 25, 2003

(54) ELECTRONIC PICTURE BOOK

(75) Inventors: Steven Rehkemper, Chicago, IL (US); Dennis J. O'Patka, Chicago, IL (US)

(73) Assignee: Rehco, LLC, Chicago, IL (US)

( * ) Notice: Subject to any disclaimer, the term of this patent is extended or adjusted under 35 U.S.C. 154(b) by 0 days.

(21) Appl. No.: 09/739,508

(22) Filed: Dec. 19, 2000

(51) Int. Cl.⁷ .................................................. G09B 5/00
(52) U.S. Cl. .......................... 345/87; 434/317; D19/26; 345/901
(58) Field of Search ................................ 434/317, 169; D19/26; 345/901, 87

(56) References Cited

U.S. PATENT DOCUMENTS

| | | | |
|---|---|---|---|
| 4,176,473 A | * 12/1979 | Rae | 434/429 |
| 4,642,054 A | * 2/1987 | Wada | 434/178 |
| 4,703,573 A | * 11/1987 | Montgomery et al. | 40/455 |
| 4,752,230 A | * 6/1988 | Shimizu | 434/317 |
| 4,819,962 A | * 4/1989 | Takai | 281/15.1 |
| 5,419,705 A | * 5/1995 | Sandvik | 428/34.8 |
| 5,477,510 A | 12/1995 | Ukita | |
| 5,520,544 A | * 5/1996 | Manico et al. | 434/317 |
| 5,534,888 A | 7/1996 | Lebby et al. | |
| 5,652,606 A | 7/1997 | Sasaki et al. | |
| D389,181 S | * 1/1998 | Fernandes et al. | D19/26 |
| 5,761,485 A | 6/1998 | Munyan | |
| 5,893,132 A | 4/1999 | Huffman et al. | |
| 5,897,324 A | 4/1999 | Tan | |
| 5,915,729 A | * 6/1999 | Vap | 281/22 |
| 5,924,068 A | 7/1999 | Richard et al. | |
| 5,941,570 A | * 8/1999 | Cole et al. | 281/38 |
| 5,970,231 A | 10/1999 | Crandall | |
| 5,991,594 A | 11/1999 | Froeber et al. | |
| 6,064,855 A | * 5/2000 | Ho | 434/317 |
| 6,164,534 A | * 12/2000 | Rathus et al. | 235/380 |

FOREIGN PATENT DOCUMENTS

| | | | |
|---|---|---|---|
| JP | 06262877 A | * | 9/1994 |
| JP | 07110664 A | * | 4/1995 |
| JP | 11151374 A | * | 6/1999 |

* cited by examiner

*Primary Examiner*—Steven Saras
*Assistant Examiner*—Leland R. Jorgensen

(57) ABSTRACT

The electronic picture book of the present invention includes a plurality of pages graphically depicting or telling a story. The book further includes an LCD screen and a speaker to provide a reader with animation sequences and sounds that relate to the graphical pictures on the pages. A set of buttons is provided to trigger the animation sequences and sounds. While reading the book, each page indicates a button to depress. The reader, depressing the correct button, is then provided with animation sequences and sounds indicative to the graphic representations on the page.

3 Claims, 4 Drawing Sheets

ELECTRONIC PICTURE BOOK

FIELD OF THE INVENTION

This invention relates to an electronic book that includes a plurality of pages and the means to display animation sequences and play audible sounds in relation to the story being told on the plurality of pages.

BACKGROUND OF THE INVENTION

Various forms of electronic books have been provided in the past. Such as:

U.S. Pat. No. 5,893,132 to Huffman discloses a method for encoding a textual book for use with an electronic book. U.S. Pat. No. 5,991,594 to Froesler discloses a device that receives cards that contain a unique text permanently stored therein and displays the text on an LCD screen. U.S. Pat. No. 5,897,324 to Tan specifically discloses an electronic book that permits reception of varying input cards such that different books may be viewed.

U.S. Pat. No. 5,761,485 to Morgan discloses an electronic book that can receive and transmit information over wireless mediums. The book, providing displays opposite each other, like facing pages, allows the user to enter information via touch sensitive screens. The electronic book also includes memory capacity to store multiple books or publications.

U.S. Pat. No. 5,534,888 to Lebby discloses an electronic book, which in one embodiment includes a plurality of pages that provide flexible screens simulating the pages of a book. The book further includes the means to receive downloads and display other books and information.

U.S. Pat. No. 5,477,510 to Ukita discloses an apparatus, which can display information or images stored on an optical disc. The display may further be manipulated with a pen to enter information using a displayed keyboard. The Ukita apparatus attempts to make electronic books thinner by stacking the keyboard within the LCD display.

U.S. Pat. No. 5,652,606 to Sasaki discloses an electronic newspaper and electronic publishing medium. The electronic newspaper can be placed in the medium in order to download the current news, which may be displayed and searched. The downloaded information may also include books, advertisements, magazines or periodicals.

U.S. Pat. No. 5,924,068 to Richard discloses a messaging service, which will allow an apparatus to receive the newspaper, edit the same, and convert the text to speech. The speech is thereafter sent to an audible output signal for the user to listen rather than read the paper.

These above-mentioned prior art references however, fail to provide a book that combines pictures and text with animation and sound. These known electronic books provide means for replacing paper pages with electronic screens and in some cases they replace the need for visual display by converting the visual text into audible sounds.

It is well known to provide electronic books that include numerous combinations of switches and buttons that are connected to a subassembly, which when pressed triggers a variety of electronic sounds. Toy books and children books have been provided that include electronic sounds that may automatically play when a page is turned or require a user to press a button to trigger the playback of pre-recorded electronic sounds. These electronic books include switches embedded in the pages, placed on the side of each page, or all placed on the side of the cover. Talking books have also been provided that trigger pre-programmed electronic voices, which may read the story so the child may follow along with the text on the pages or may supplement the story by providing sound effects. In addition, electronic books have been provided that include an array of buttons that when pressed in different sequences tell different stories.

Nevertheless, while these prior electronic books have provided a multitude of buttons to trigger electronic sounds and sound effects, the prior art is devoid of an electronic book which combines these electronic sounds and sound effects with preprogrammed electronic animation in order to supplement the story, characters or information graphically or textually depicted on the pages. Rather than replacing the pages, with electronic screens, there is a need to provide electronic animation and sound to supplement the story depicted on the pages. As such a need exists to provide a book that combines pictures and text with animation and sound, which gives the perception that the book is brought to life. Not only is the reader capable of enjoying the pictures and text on a page, but the reader is also provided with visual animation and audible sound.

SUMMARY OF THE INVENTION

In accordance with the present invention an electronic picture book is provided that includes a plurality of pages, a subassembly that includes an LCD display and a speaker to provide the user with a variety of pictures, words, animation sequences and sounds. The plurality of pages provides the user with a general description of a story, which may include various drawings, pictures, and/or words in relation to a story. The pages further direct the user to press a specific button, from a plurality of buttons. Once pressed, the buttons trigger electronics to display various animation sequences and emit electronic sounds via the LCD screen and speaker. The animation sequence and sounds, relating to the story being told on the plurality of pages, brings the story to life.

In one embodiment, the electronic picture book includes the same number of pages as buttons; thereby eliminating the need to keep track of which page has been turned. For example, a three-page book would only require three buttons. This also allows the books to be made inexpensively, such as for children books.

In an alternative embodiment of the present invention, multiple sets of pages may be associated to a single set of buttons. To indicate to the electronics which animation sequences and sounds should be played in relation when the buttons are pressed, a light sensor may be provided on the subassembly. The plurality of pages would include a bottom set of pages having an aperture defined over the light sensor, wherein a top set of pages would not include the aperture. When the top pages are covering the light sensor, the electronics would know to play animation sequences associated to the top set: of pages, however, when the top pages are turned, the apertures defined in the bottom set of pages would allow light into the light sensor. The electronics receiving a signal from the light sensor would reassign the buttons to, when pressed, play animation sequences associated to the bottom set of pages.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DESCRIPTION OF THE EMBODIMENTS

Figure 1:
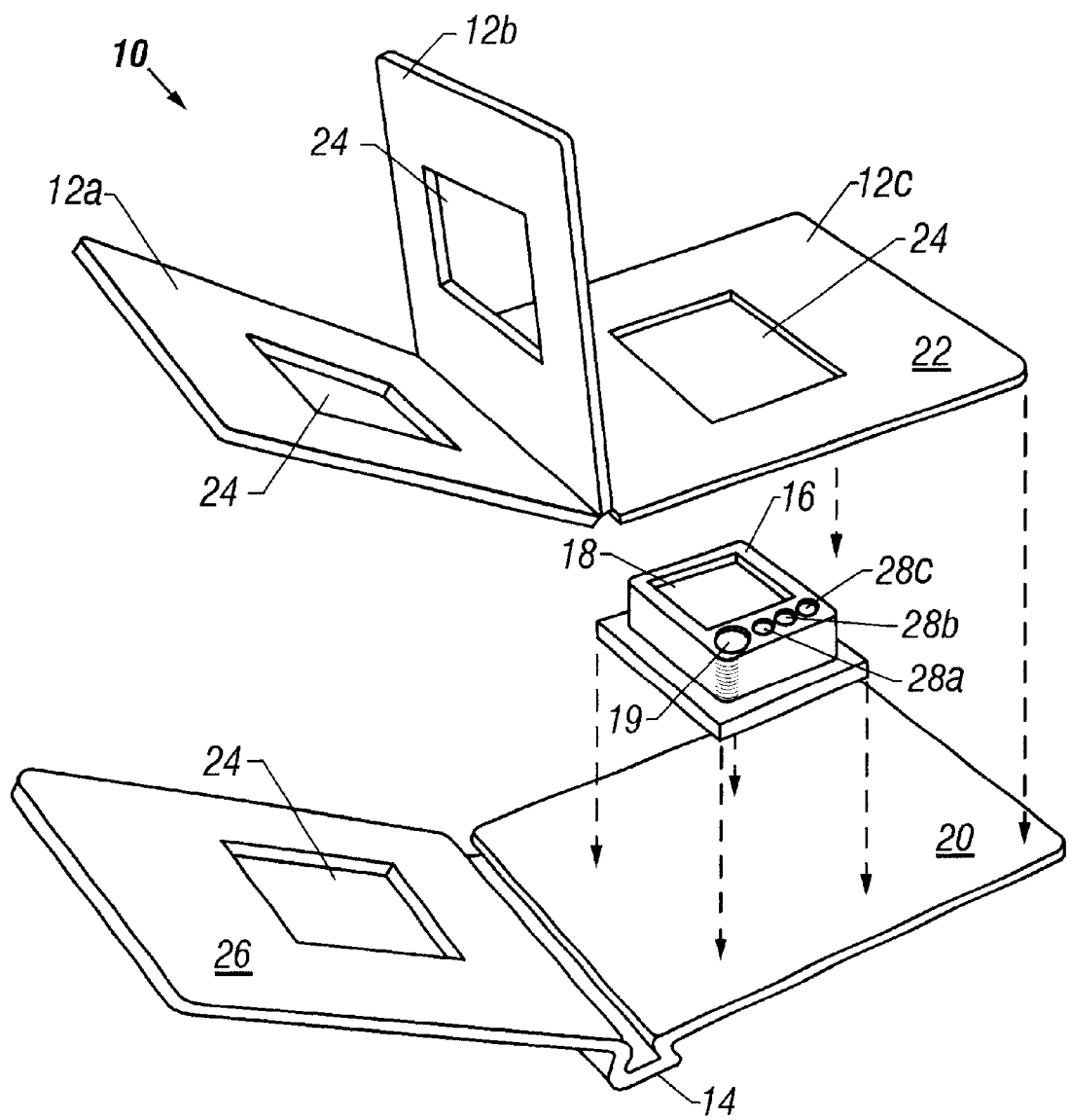
FIG. 1 is an exploded view of an electronic picture book having a light sensor in accordance with the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Illustrated by various components, an electronic book 10 is shown in FIG. 1. The electronic book 10 includes a plurality of pages 12a–12c, generally referenced to as 12, which are bound to a cover 14. A subassembly 16, which includes an LCD screen 18 and a speaker 19, is mounted to the inside back cover 20. The last page 22 in the plurality of pages 12 is further secured to the inside back cover 20, thereby securing the subassembly 16 in the electronic book 10. As illustrated, each page 12 includes a window 24 that is sized to receive the subassembly 16, such that the LCD screen 18 is viewed through all of the pages 12 when such pages are closed. Moreover, even the front cover 26 may include a window 24, such that the LCD screen 18 may be viewed through the cover 26 of the book. A plurality of buttons 28a–28c, generally referenced to as 28, discussed in greater detail below, is provided about the subassembly 16 and is in communication with electronics (not shown) housed in the subassembly 16. The electronics stores and plays back various images or animation sequences on the LCD screen 18 and various electronic sounds through the speaker 19. The subassembly 16 may also include a power source or battery unit (not shown) and a switch to turn the power source on and off.

As opposed to the prior art, the electronic book of the present invention displays animation sequences that are related to the graphical representations on the plurality of pages. This provides the user with graphical pictures on the pages, plus animation and sounds to bring the book to life.

Figure 2:
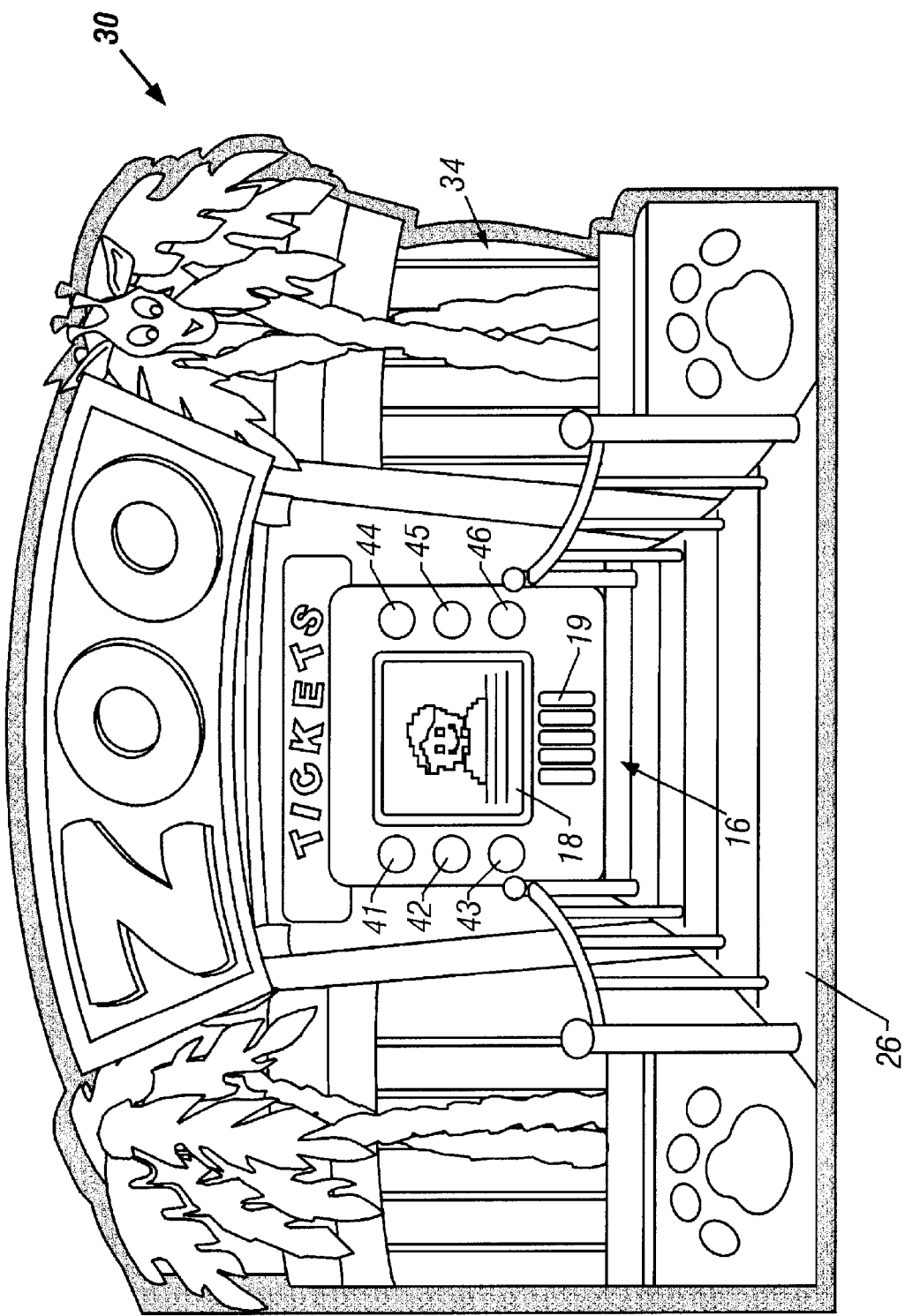
FIG. 2 is a front view of an electronic picture book having a cover indicative of telling a story in relation to a trip to the zoo.

As illustrated in FIG. 2 various covers 34 may be designed to provide the user with different a theme or story. The user upon opening the front cover 26 is shown graphic pictures and/or words on the first page, of the plurality of pages 12. Each book preferably includes a single button for each page, thereby eliminating the need for the electronics to keep track of when a page has been turned and what page the user is reading. For example, referring back to FIG. 1, the three-page book would only require three buttons, or as illustrated in FIG. 2, the book 30 would include six pages, since there are six buttons (labeled numerically 41–46). This also allows the books to be made inexpensively, such as for children books. However, it is contemplated by the invention, that the electronics may keep track of which page or pages has been turned.

In order to indicate to the reader which button to press, the graphics or text on each page could indicate which button to depress. As such, still referring to FIG. 1, the user upon turning the front cover 26 over would see the first page 12a, which would indicate to the reader to press the first button 28a. This may be done by coloring or numbering each button such that the text could read, "Press the red button" or "Press button 1." Alternatively, the graphics on each page may illustrate a hand or a pointer, pointing to the button to be pressed. The user upon pressing the button, that was indicated by the page, will be provided with an animation sequence on the LCD screen 18 and sounds through the speaker 19, which relate to that specific page, such that while reading the entire book, the user is provided with animation and sound plus graphics and/or text that relate to the story or theme being told. When the animation sequence for the first page is complete the user may turn to the second page 12b and be provided with more pictures and text, as well as being told to press the second button 28b, this continuing until all of the pages have been turned.

Figure 3:
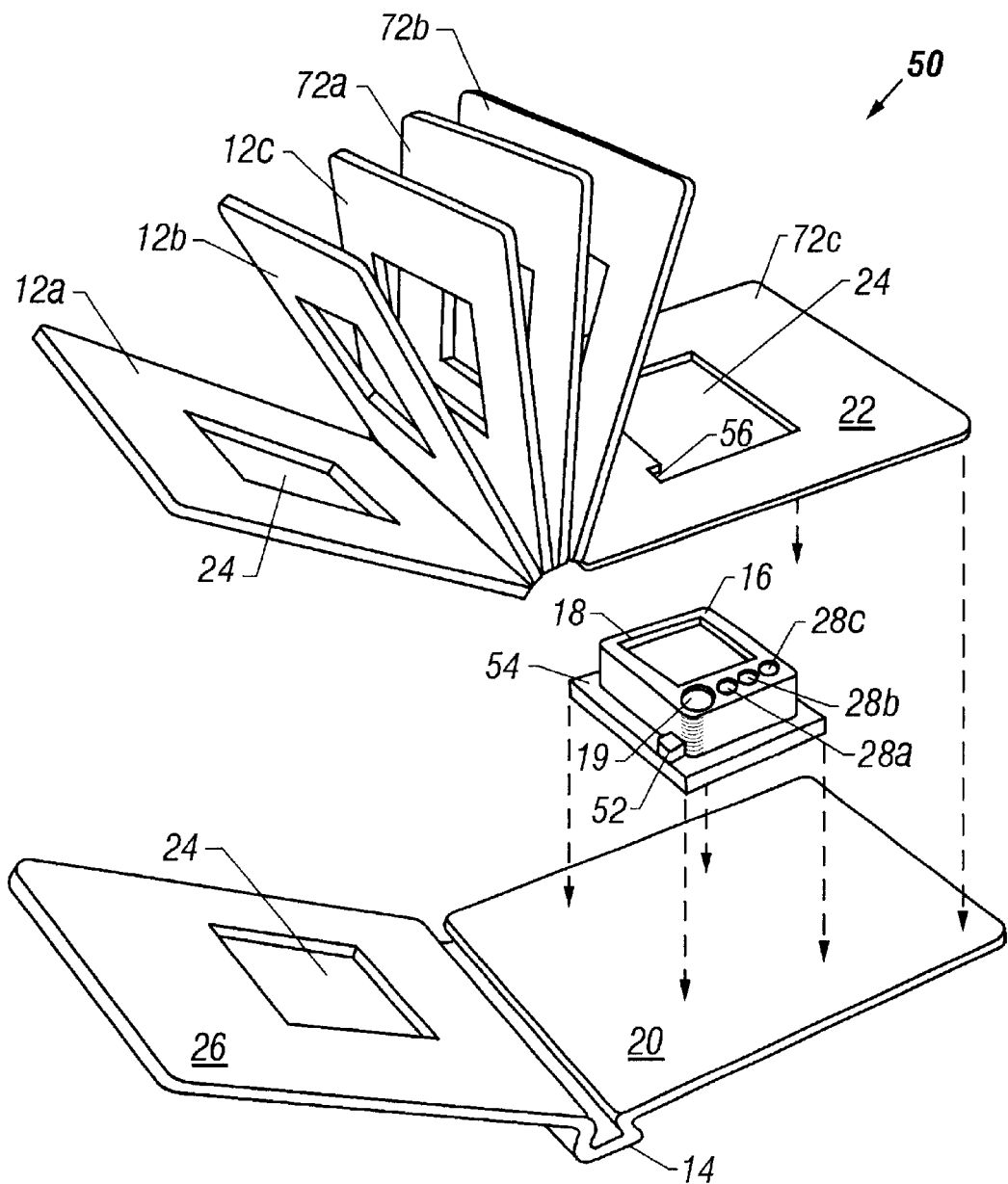
FIG. 3 is an exploded view of an electronic picture book having a light sensor to determine when the user has turned to the bottom set of pages.

Referring now to FIG. 3, in an alternative embodiment rather than including a single set of pages equal to the number of buttons, the electronic book 50 may include a second set of pages also equal to the number of buttons. As such the electronic book may include six pages 12a–12c and 72a–72c for three buttons 28a–28c, or twelve pages for six buttons. Since each button 28 relates to two separate pages, the electronics, housed in the subassembly 16, will include two animation sequences and electronic sounds for each button. To indicate to the electronics which animation sequence and sounds to play, the electronic book includes a light sensor 52 mounted at the base 54 of the subassembly 16. A portion of the pages 12 would further include an aperture 56 that when uncovered would allow light into the light sensor 52.

Figure 4A:
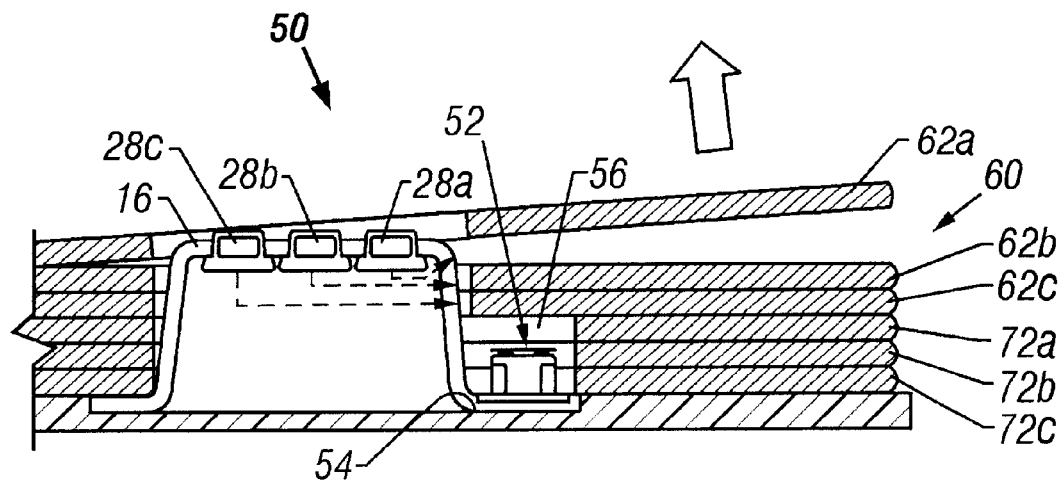
FIG. 4a is a cross-section through the electronic picture book of FIG. 3 having a light sensor for determining when a set of pages has been turned.
Figure 4B:
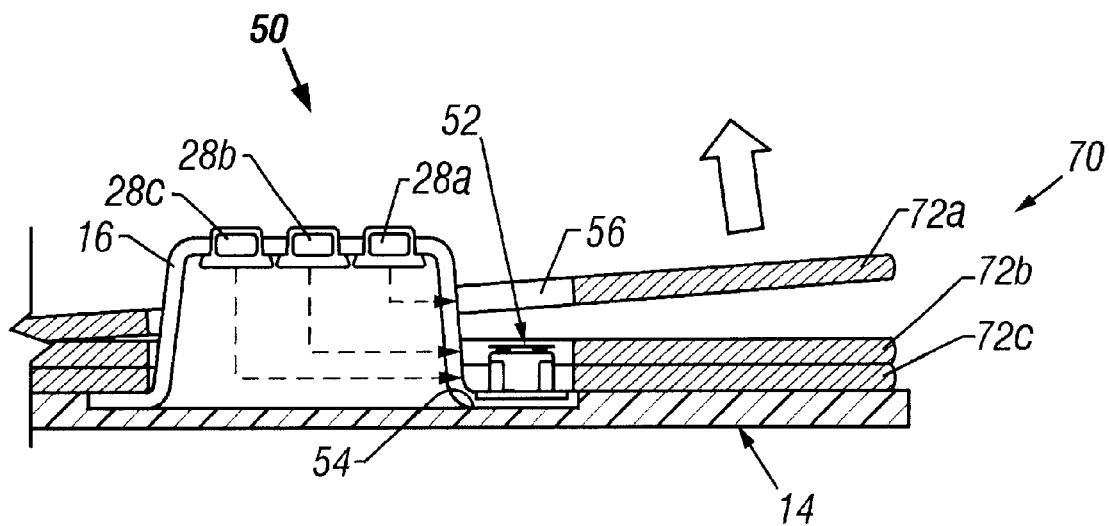
FIG. 4b is a cross-section of FIG. 3 when the top pages have been turned allowing light to enter the light sensor.

Referring now to FIGS. 4a and 4b, the book 50 includes two sets of pages, a first set 60 that includes the first three pages, page one 62a, page two 62b and page three 62c; and a second set 70 that includes the last three pages, page four 72a, page five 72b and page six 72c. The book 50 also includes three buttons, referenced generally as 28, button one 28a, button two 28b and button three 28c, which are electronically programmed such that button one 28a when pressed triggers animation sequences and sounds relating to either page one 62a or page four 72d; button two 28b relates to either page two 62b or page five 72b; and button three 28c relates to page three 62c or page six 72c. As mentioned above, the light sensor 52 sends a signal to the electronics such that the electronics may determine which set of pages the user is reading. When the user is reading the first set of pages 60, which do not include an aperture, the light sensor 52 is covered. Each of the pages in the first set 60, include a reference to one of the three buttons, such as described above. The electronics, within the subassembly 16, not receiving an signal from the light sensor 52 can determine that the buttons 28 currently refer to the first set of pages 60, such that when the buttons are depressed, the electronics will play animation and sounds indicative of a page in the first set of pages 60. Referring now to FIG. 4b, when the first set of pages 60 have been turned, the second set of pages 70, having the aperture 56, will let light into the light sensor 52. The electronics, now receiving a signal from the light sensor 52, will reassign the buttons 28 to play animation and sounds indicative of the second set of pages 70. As such, the electronic book having three buttons can have multiple sets of three pages, provided that the electronic book includes a light sensor for every set of pages above the original first set of pages, for example, a nine page book can have three buttons with two light sensors, or a 16 page book can have four buttons with three sensors, etc.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An electronic picture book comprising:

a plurality of pages consisting of pictures and text that tell a story, each page further includes a window and is bound to a cover;

a subassembly having an LCD screen, a speaker and a plurality of buttons, the subassembly being mounted to the cover such that the LCD screen may be viewed through the windows of the plurality of pages and wherein the number of buttons, in the plurality of buttons, are equal to the number of pages, in the plurality of pages;

each page including an indication to a reader to press one of the buttons, of the plurality of buttons;

electronics housed within the subassembly and being pre-programmed with a plurality of animation sequences and corresponding sounds indicative to the story on the plurality of pages, and wherein the animation sequences and corresponding sounds separately correspond to one of the buttons, in the plurality of buttons, in order to provide the user with a means to activate a specific animation sequence and corresponding sound by pressing a single button, when indicated by the indication on a page, whereby when a reader turns to a page, in the plurality of pages, and presses a button that is indicated by said page, the electronics will display an animation sequence and emit corresponding sounds related to the story on said page.

2. The electronic picture book of claim 1, further comprising:

a light sensor mounted to the subassembly and in communication with the electronics;

the plurality of pages being separable into a top set of pages and a bottom set of pages, the bottom set of pages further including an aperture that is sized to permit light to enter the light sensor when the aperture is uncovered by the top set of pages, and such that when light enters the light sensor, the light sensor sends a signal to the electronics that the reader is reading the bottom set of pages, and wherein the number of pages in the top set of pages and the number of pages in the bottom set of pages is equal to the number of buttons; and when the aperture is covered and a user presses a button indicated by the indication on a page, the electronics will replay animation sequences and corresponding sounds indicative of the page in the top set of pages and when the aperture is uncovered, and a user presses a button indicated by the indication on a page, the electronics receiving such signal from the light sensor and said button, will replay animation sequences and corresponding sounds indicative of the page in the bottom set of pages.

3. The electronic picture book of claim 2 wherein the plurality of pages is defined into a primary set of pages and multiple secondary sets of pages, and each set of pages, defined by the multiple secondary sets of pages includes an aperture defined to be uncovered when all pages in preceding sets of pages are turned, and the number of pages in each set of pages equals the number of buttons; and each set of pages in the multiple secondary sets of pages includes a light sensors in communication with the electronics and aligned with the aperture in the preceding set of pages and defined to send a signal to the electronics when all pages in preceding sets of pages are turned such that the electronics can determine which set of pages a user is reading; and whereby a user turning to a page and pressing a buttons indicated by said page the electronics will determine which set of pages the user has turned to and will replay an animation sequence and emit corresponding sounds that are indicative to the story on said page.

* * * * *